(12) United States Patent
Raun et al.

(10) Patent No.: US 7,188,450 B2
(45) Date of Patent: Mar. 13, 2007

(54) USE OF WITHIN-FIELD-ELEMENT-SIZE CV FOR IMPROVED NUTRIENT FERTILIZATION IN CROP PRODUCTION

(75) Inventors: William R. Raun, Stillwater, OK (US); Gordon V. Johnson, Stillwater, OK (US); John B. Solie, Stillwater, OK (US); Marvin L. Stone, Stillwater, OK (US); Kyle Freeman, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 169 days.

(21) Appl. No.: 10/801,757

(22) Filed: Mar. 16, 2004

(65) Prior Publication Data

US 2004/0231239 A1   Nov. 25, 2004

Related U.S. Application Data

(63) Continuation-in-part of application No. 10/195,138, filed on Jul. 12, 2002, now Pat. No. 6,880,291, which is a continuation-in-part of application No. 09/911,867, filed on Jul. 24, 2001, now Pat. No. 6,601,341.

(51) Int. Cl.
*A01C 21/00* (2006.01)
*A01G 7/00* (2006.01)

(52) U.S. Cl. ............... 47/58.1 SC; 71/1; 701/50; 702/5

(58) Field of Classification Search .......... 47/58.1 SC; 71/1; 701/50; 702/5
See application file for complete search history.

(56) References Cited

U.S. PATENT DOCUMENTS 3,670,963 A   6/1972   Stroebel et al. .............. 239/77

(Continued)

FOREIGN PATENT DOCUMENTS

DE   198 60 306 A1   3/2000

(Continued)

OTHER PUBLICATIONS

Yang et al. 2000. Airborne multispectral digital imagery for detecting plant growth and yield variability for a grain sorghum field. Proceedings of the 2nd Int'l Conf. on Geospacial Information Agric. and Forestry. Lake Buena Vista, FL 2:477-485.*

(Continued)

*Primary Examiner*—Jeffrey L. Gellner
(74) *Attorney, Agent, or Firm*—Fellers, Snider, Blankenship, Bailey & Tippens, P.C.

(57) ABSTRACT

A method for in-season macro and micronutrient application based on predicted yield potential, coefficient of variation, and a nutrient response index. The inventive method includes the steps of: determining a nutrient response index for a field; determining the normalized difference vegetation index (NDVI) of an area to fertilize; determining the coefficient of variation of NDVI over a plot; determining a predicted crop yield for the area without additional nutrient; determining an attainable crop yield for the area with additional nutrient; determining the nutrient requirement for the area as the difference between the nutrient removal at the attainable yield minus the nutrient removal at the predicted yield, adjusted by the efficiency of nutrient utilization in the particular crop as indicated by the coefficient of variation.

9 Claims, 6 Drawing Sheets

U.S. PATENT DOCUMENTS

| | | | | |
|---|---|---|---|---|
| 3,910,701 | A | 10/1975 | Henderson et al. | 356/39 |
| 4,952,229 | A | 8/1990 | Muir | 71/7 |
| 5,144,767 | A | 9/1992 | McCloy et al. | 47/1.7 |
| 5,222,324 | A | 6/1993 | O'Neall et al. | 47/1.7 |
| 5,296,702 | A | 3/1994 | Beck et al. | 250/226 |
| 5,389,781 | A | 2/1995 | Beck et al. | 250/226 |
| 5,507,115 | A | 4/1996 | Nelson | 47/1.7 |
| 5,585,626 | A | 12/1996 | Beck et al. | 250/222.1 |
| 5,606,821 | A | 3/1997 | Sadjadi et al. | 47/1.7 |
| 5,763,873 | A | 6/1998 | Beck et al. | 250/214 B |
| 5,764,819 | A | 6/1998 | Orr et al. | 382/110 |
| 5,768,823 | A | 6/1998 | Nelson | 47/1.7 |
| 5,789,741 | A | 8/1998 | Kinter et al. | 250/226 |
| 5,793,035 | A | 8/1998 | Beck et al. | 250/222.1 |
| 5,809,440 | A | 9/1998 | Beck et al. | 701/50 |
| 5,833,144 | A | 11/1998 | Kinter | 239/462 |
| 5,837,997 | A | 11/1998 | Beck et al. | 250/227.11 |
| 5,850,620 | A | 12/1998 | Skotnikov et al. | 702/3 |
| 6,052,187 | A | 4/2000 | Krishnan et al. | 356/364 |
| 6,062,496 | A | 5/2000 | Kinter | 239/462 |
| 6,160,902 | A | 12/2000 | Dickson et al. | 382/110 |
| 6,178,253 | B1 | 1/2001 | Hendrickson et al. | 382/110 |
| 6,366,681 | B1 | 4/2002 | Hutchins | 382/110 |
| 6,393,927 | B1 | 5/2002 | Biggs et al. | 73/866 |
| 6,444,975 | B1 | 9/2002 | Reusch | 250/222.1 |
| 6,601,341 | B2 | 8/2003 | Raun et al. | 47/58.1 |
| 2003/0019152 | A1 | 1/2003 | Raun et al. | 47/58.1 |

FOREIGN PATENT DOCUMENTS

| | | |
|---|---|---|
| DE | 199 13 971 A1 | 9/2000 |
| EP | 1 429 594 B1 | 4/2003 |
| WO | WO 01/45490 A1 | 6/2001 |

OTHER PUBLICATIONS

Perry et al. 1984. Functional Equivalnce of Spectral Vegetation Indices. Remote Sensing of Enviironment 14: 169-182.*

LaRuffa, J.M., et al. 2001. "Optimum field element size for maximum yields in winter wheat, using variable nitrogen rates." *Journal of Plant Nutrition.* 24(2):313-325.

Lukina, E.V., et al. 2001. "Nitrogen fertilization optimization algorithm based on in-season estimates of yield and plant nitrogen uptake." *Journal of Plant Nutrition.* 26(6): 885-898.

Patchen Weed Seeker™ PhD1620 Brochure, Undated.

Patchen Ween Seeker™ PhD600 Brochure, Undated.

Raun, W.R., et al. 2001. "In-season prediction of potential grain yield in winter wheat using canopy reflectance." *Agronomy Journal.* 93:131-138.

Sérelé, C.Z., et al. 2000. "Detection of corn nitrogen status from airborne vis-Nir imagery using artificial neural networks." Proceedings of Fifth International Conference on Precision Agriculture. Unnumbered.

Solie, J.B., et al. 2000. "In-season N fertilization using an in-season estimate of potential yield." Proceedings of Fifth International Conference on Precision Agriculture. Unnnumbered.

Solie, J.B., et al. 1996. "Optical sensor based field element size and sensing strategy for nitrogen application." *Transactions of the ASAE* 39(6):1983-1992.

Staggenborg, S.A., et al. 2000. "Predicting grain yield variability with infrared images." Proceedings of Fifth International Conference on Precision Agriculture. Unnumbered.

Stone, M.L., et al. 1996. "Use of spectal radiance for correcting in-season fertilizer nitrogen deficiencies in winter wheat." *Transaction of ASAE.* 39(5): 1623-1631.

Yang, C., et al. 2000. "Relationships between yield monitor data and airborne multispectral digital imagery." Proceedings of Fifth International Conference on Precision Agriculture. Unnumbered.

Hooper, A.W. 1976. A photoelectric sensor for distinguishing between plant material and soil. *J. Agric. Eng. Res.* vol. 21, 145-155.

Industrial Control Applications, Mar. 1991. Infrared sensing and data transmission fundamentals. Motorola. DL412/D, AN1016, pp. 349-354; http://www.web-ee.com/primers/files/an1016.rev0.pdf.

"Seeing the Light of Nitrogen." *Nebraska Farmer.* Mid-Feb. 1996, pp. 14-16.

Palmer, J et al. 1971. Automatic control of sugar beet singling and thinning by means of an on-line digital computer. *J. Agric. Eng. Res.* vol. 16 (2) pp. 107-125.

Ritchie, J.C etal. 1992. Airborne laser measurements of rangeland canopy cover and distribution. *J. Range Manage.* 45:189-193.

Stafford, J.V. et al. 1989. A portable infrared moisture meter for agricultural and food materials: Part 1, Instrument development. *J. Agric. Eng. Res.* vol. 43, pp. 45-56.

Stone, M. et al. ~1994 to 1995. High Speed Networking in Construction and Agricultural Equipment. Web Pub. http://biosystems.okstate.edu/Home/mstone/hsnet.htm.

Tools with Eyes. Mid-Mar. 1989. *Farm Journal.* pp. 16-18.

* cited by examiner

USE OF WITHIN-FIELD-ELEMENT-SIZE CV FOR IMPROVED NUTRIENT FERTILIZATION IN CROP PRODUCTION

CROSS REFERENCE TO RELATED APPLICATION

This application is a continuation-in-part of U.S. patent application Ser. No. 10/195,138, filed Jul. 12, 2002, now U.S. Pat. No. 6,880,291, which is a continuation-in-part of U.S. patent application Ser. No. 09/911,867, filed Jul. 24, 2001, now U.S. Pat. No. 6,601,341.

BACKGROUND OF THE INVENTION

1. Field of the Invention

This invention relates generally to a method for determining a rate of application of fertilizer. More particularly, but not by way of limitation, the present invention relates a method for in-season macro and micronutrient application using within-element-size coefficient of variation to improve a prediction of yield potential, and hence, to more accurately predict the nutrient requirements of the crop.

2. Background

Presently, there is a need for a convenient method to determine the amount of fertilizer required to optimize the yield of a particular crop. While soil samples may be analyzed to determine the soil condition, the process is neither convenient nor is it conducive to advanced farming techniques such as precision farming.

"Precision farming" is a term used to describe the management of intrafield variations in soil and crop conditions. "Site specific farming", "prescription farming", and "variable rate application technology" are sometimes used synonymously with precision farming to describe the tailoring of soil and crop management to the conditions at discrete, usually contiguous, locations throughout a field. The size of each location depends on a variety of factors, such as the type of operation performed, the type of equipment used, the resolution of the equipment, as well as a host of other factors. Generally speaking, the smaller the location size, or plot, the greater the benefits of precision farming, at least to areas of approximately one-half square meter.

Typical precision farming techniques include: varying the planting density of individual plants based on the ability of the soil to support growth of the plants; and the selective application of farming products such as herbicides, insecticides, and, of particular interest, fertilizer.

In contrast to precision farming, the most common farming practice is to apply a product to an entire field at a constant rate of application, often based on a predicted crop yield. The rate of application is selected to maximize crop yield over the entire field. Unfortunately, it would be the exception rather than the rule that all areas of a field have consistent soil conditions and consistent crop conditions. Accordingly, this practice typically results in over application of product over a portion of the field, which wastes money and may actually reduce crop yield, while also resulting in under application of product over other portions of the field, which may also reduce crop yield.

Perhaps even a greater problem with conventional methods is the potential to damage the environment through the over application of chemicals. Excess chemicals, indiscriminately applied to a field, ultimately find their way into the atmosphere, ponds, streams, rivers, and even the aquifer. These chemicals pose a serious threat to water sources, often killing marine life, causing severe increases in algae growth, leading to eutrophication, and contaminating potable water supplies.

From the early 1950's through the early 1970's, increased food production was a priority in agricultural circles around the world. During this period it was noted that nitrogen fertilizer had the single largest impact on yield and, as a result, the largest increase in the use of agricultural inputs has been nitrogen. Although fertilizer nitrogen consumption and grain production have both increased over the last five decades, contamination of surface water and ground water supplies continues because the efficiency at which fertilizer nitrogen is used has remained at a stagnant, and dismal, 33%, worldwide. While the unaccounted for nitrogen (67% of applied fertilizer nitrogen) has been well documented, heretofore, there has been no significant improvement on the inefficiency at which nitrogen is used in cereal production.

Thus it can be seen that there are at least three advantages to implementing precision farming practices. First, precision farming has the potential to increase crop yields, which will result in greater profits for the farmer. Second, precision farming may lower the application rates of seeds, herbicides, pesticides, and fertilizer, reducing a farmer's expense in producing a crop. Finally, precision farming will protect the environment by reducing the amount of excess chemicals applied to a field, which may ultimately end up in a pond, stream, river, and/or other water source.

Predominately, precision farming is accomplished by either: 1) storing a prescription map of a field wherein predetermined application rates for each location are stored for later use; or 2) by setting application rates based on real-time measurements of crop and/or soil conditions. In the first method, a global positioning system (GPS) receiver, or its equivalent, is placed on a vehicle. As the vehicle moves through the field, application rates taken from the prescription map are used to adjust variable rate application devices such as spray nozzles. A number of difficulties are associated with the use of such a system, for example: due to the offset between the GPS receiver and the application device, the system must know the exact attitude of the vehicle in order to calculate the precise location of each application device, making it difficult to achieve a desirable location size; soil and plant conditions must be determined and a prescription developed and input prior to entering the field; and resolving a position with the requisite degree of accuracy requires relatively expensive equipment.

In the latter method, a sensor is used to detect particular soil and plant conditions as the application equipment is driven through the field. The output of the sensor is then used to calculate application rates and adjust a variable rate application device in real time. Since the physical relationship between the sensor and the application device is fixed, the problems associated with positional based systems (i.e., GPS) are overcome. In addition, the need to collect crop data prior to entering the field is eliminated, as is the need for a prescription map.

With either technique, there is a need to sense the soil and/or crop conditions in order to determine a rate of application of a given farm product. With regard to soil analysis, attempting to analyze the soil condition by way of a soil sample at each site would be time consuming and the handling of individual samples would be a logistical nightmare. Even with in-field analysis, the task would be daunting, at best.

Co-pending U.S. patent application Ser. No. 10/195,138, filed by Raun, et al., which is incorporated herein by reference, describes a method for determining in-season macro and micronutrient application based on predicted yield potential and a nutrient response index. With the method of Raun, et al., remote sensing may be employed to determine plant need for a particular nutrient and to determine mid-season yield potential. An optical sensor is used to measure the reflectance of a target plant at one or more wavelengths of light and, based on known reflectance properties of the target, an output is provided which is indicative of the need for the nutrient. The specific need is determined from a response index for the field, which is calculated by scanning a nutrient rich reference strip and a reference strip fertilized according to the common practice for the field. It has been found that the method of Raun, et al. provides increased yield with overall lower fertilizer application rates with plot sizes as small as 0.4 square meters.

Research also suggests that the coefficient of variation ("CV") for plant conditions within a particular plot provides meaningful insight into the nutrient requirements for the plot. The coefficient of variation is defined as the standard deviation divided by the mean times one hundred (given in percentage). Generally speaking, plot size is ideally that area which provides the most precise measure of the available nutrient, where the level of nutrient changes with distance. CV, on the other hand, provides an indication of variability within a plot, which is likely due to factors other than nutrient availability.

Thus it is an object of the present invention to provide a convenient method for determining an application rate for the in-season application of nutrients, which is non-invasive to growing crops and is conducive to advanced farming techniques.

It is a further object of the present invention to refine previous precision farming techniques, using the coefficient of variation, to further improve nutrient application rates.

SUMMARY OF THE INVENTION

The present invention provides a method for determining in-season macro and micronutrient application based on predicted yield potential, as adjusted by the coefficient of variation ("CV") of the crop within the sensed area as measured by an optical, or other, sensor, and a nutrient response index. In a preferred embodiment of the inventive method, remote sensing is employed to determine plant need for a particular nutrient and to determine mid-season yield potential. In a preferred embodiment, an optical sensor is used to measure the reflectance of a target plant, or plants, within a particular plot, at one or more wavelengths of light and, based on known reflectance properties of the target; an output is provided which is indicative of the need for the nutrient. Intraplot sensor readings are also taken to determine the coefficient of variation ("CV") of plant condition within the plot. Where CV is high, the potential yield is adjusted downward to account for factors, which will limit production other than nutrient stress. The inventive process is applicable to crop nutrients whose projected need can be based on predicted removal of the nutrient derived from potential yield. The inventive process is particularly well suited to the mid-season application of nitrogen and/or other nutrients where deficiencies can be corrected by mid-season applications.

In another preferred embodiment, for crops in which plant height is indicative of yield, i.e. corn, a sensor, such as an ultrasonic or radar sensor, is used to measure plant height. Intraplot variations in plant height are used to determine the CV of plant condition within the plot. As with the optical sensor, where CV is high, the maximum potential yield is adjusted downward to account for factors, other than nutrient stress, which will limit production.

Generally speaking, where factors affecting soil productivity, i.e., soil depth, slope, moisture holding capacity, soil compaction, and the like, are uniform, CV's are expected to be relatively homogenous and low. Under such conditions, one would expect uniform plant stands and uniform plant growth. In contrast, where factors affecting soil productivity vary widely, CV's are expected to be relatively high. Under growing conditions with a high CV, poor plant conditions may be caused by mechanical problems combined with specific soil conditions rather than by lack of available nutrients.

Efficiency of site-specific nutrient management is largely determined by how well small-scale spatial variability is managed and the time when fertilizers are applied. During the crop growing-season (in-season), knowledge of yield potential is a key to successful variable rate nutrient applications. The dependency of the yield potential with an added nutrient to sensed and known factors may be expressed as a function of the normalized difference vegetation index ("NDVI"), the number of days the crop has been growing, and the coefficient of variation of NDVI measurements within the plot being assessed for nutrient fertilization.

In the inventive method, the normalized difference vegetation index is preferably calculated from reflectance information gathered by scanning a plant or plants within an area scanned and treated. Virtually any method of measuring the reflectance, or other measure of plant growth, of individual plants or small groups of plants will provide the desired results. As a practical matter however, to determine CV, the resolution of the sensor must allow for successive measurements within a plot. In one preferred embodiment of the inventive method, as many as 70 reflectance measurements are taken within a 0.4 square meter area.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

As will become apparent to those skilled in the art from the discussion hereinbelow, practice of the present invention potentially increases crop yield while reducing the total amount of nutrients, such as nitrogen, added to a crop. While the inventive method is applicable to virtually any crop, for purposes of example, and not by way of limitation, the description of the preferred embodiments is directed to production of winter wheat. In practice, preferably side-by-side reference strips are planted along with the crop. A first reference strip is planted in accordance with the common practice in the field and a second strip is fertilized such that a particular nutrient is not limiting to the plant production. The response of the crop to the nutrient can then be determined, as quantified in a response index, by comparison of the reference strips.

In-season measurements are then made of crop biomass on a site-by-site basis to determine a yield potential. A potential yield with added nutrient can then be calculated by multiplying the yield potential by the response index, where the extrapolated yield is capped at a maximum yield for the crop in light of the growing environment. Preferably, multiple measurements are made over each site and a coefficient of variation ("CV") is calculated for each site and used to modify the response index for the site to account for factors which will limit the potential yield with added nutrient other than nutrient stress.

Figure 1A:
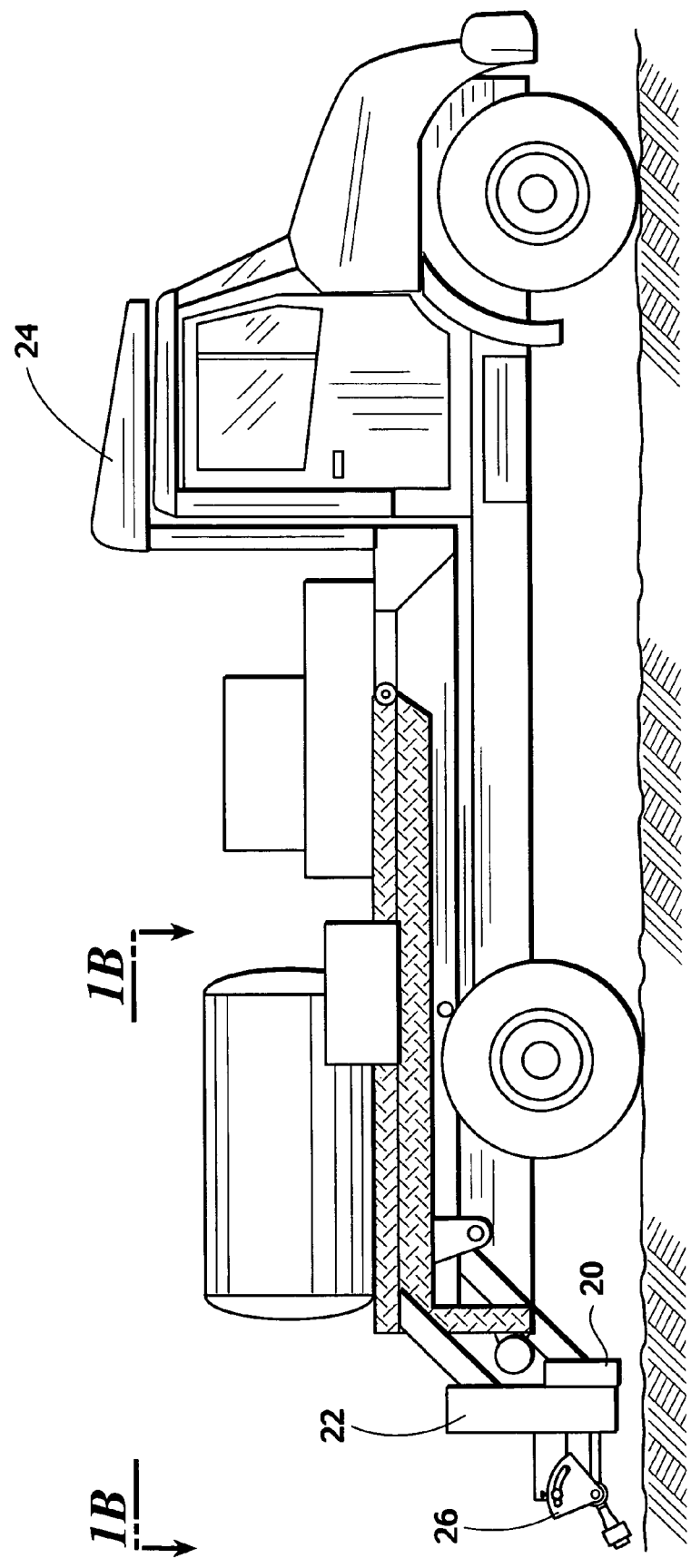
FIG. 1A provides a side view of a farming vehicle having multiple sensors and spray nozzles for use with the inventive method mounted thereon.
Figure 1B:
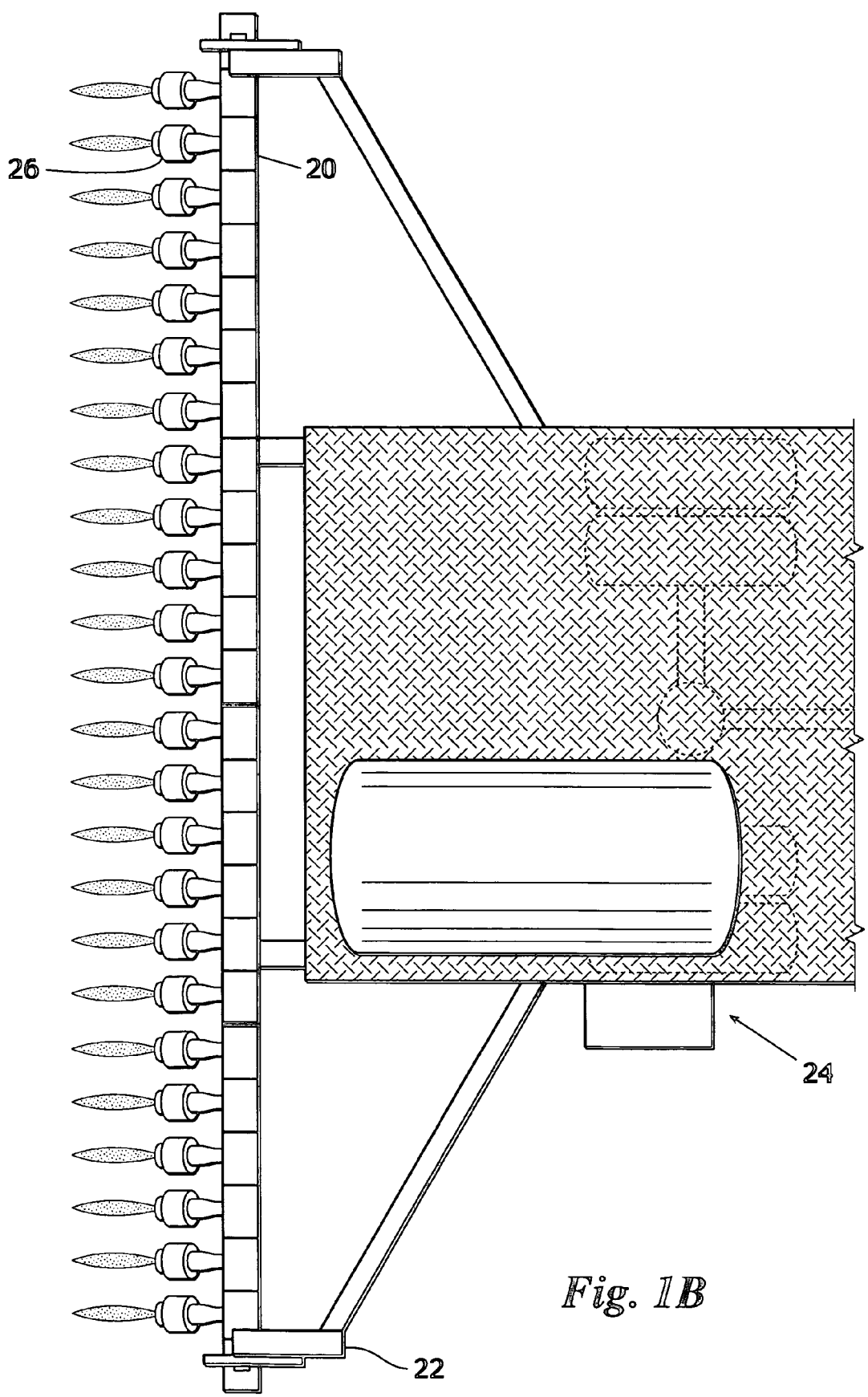
FIG. 1B provides a top view of the farming vehicle having a typical arrangement of sensors and spray nozzles for use with the inventive method mounted thereon.

Referring now to the drawings, wherein like reference numerals indicate the same parts throughout the several views, a preferred embodiment of the inventive method is incorporated in the fertilizer spreading vehicle 24 shown in FIGS. 1A and 1B. Preferably, a plurality of sensors, of which sensor 20 is representative, are disposed along boom 22 at substantially equal spacings. Typically boom 22 extends laterally from vehicle 24. Spray nozzles, of which nozzle 26 is representative, are also disposed along boom 22 preferably such that a nozzle 26, or group of nozzles, corresponds to each sensor 20. As the vehicle 24 travels along a crop row, boom 22 projects over the plants such that each sensor 20 measures the reflectance of plants in its immediate view, determines the extent to which fertilizer is needed according to the inventive method, and controls the rate of application of a nutrient through its corresponding nozzle 26. A system suitable for use with the inventive method is disclosed in co-pending U.S. patent application Ser. No. 10/195,138, entitled "Process for In-Season Fertilizer Nutrient Application Based on Predicted Yield Potential" which is incorporated herein by reference.

Figure 2:
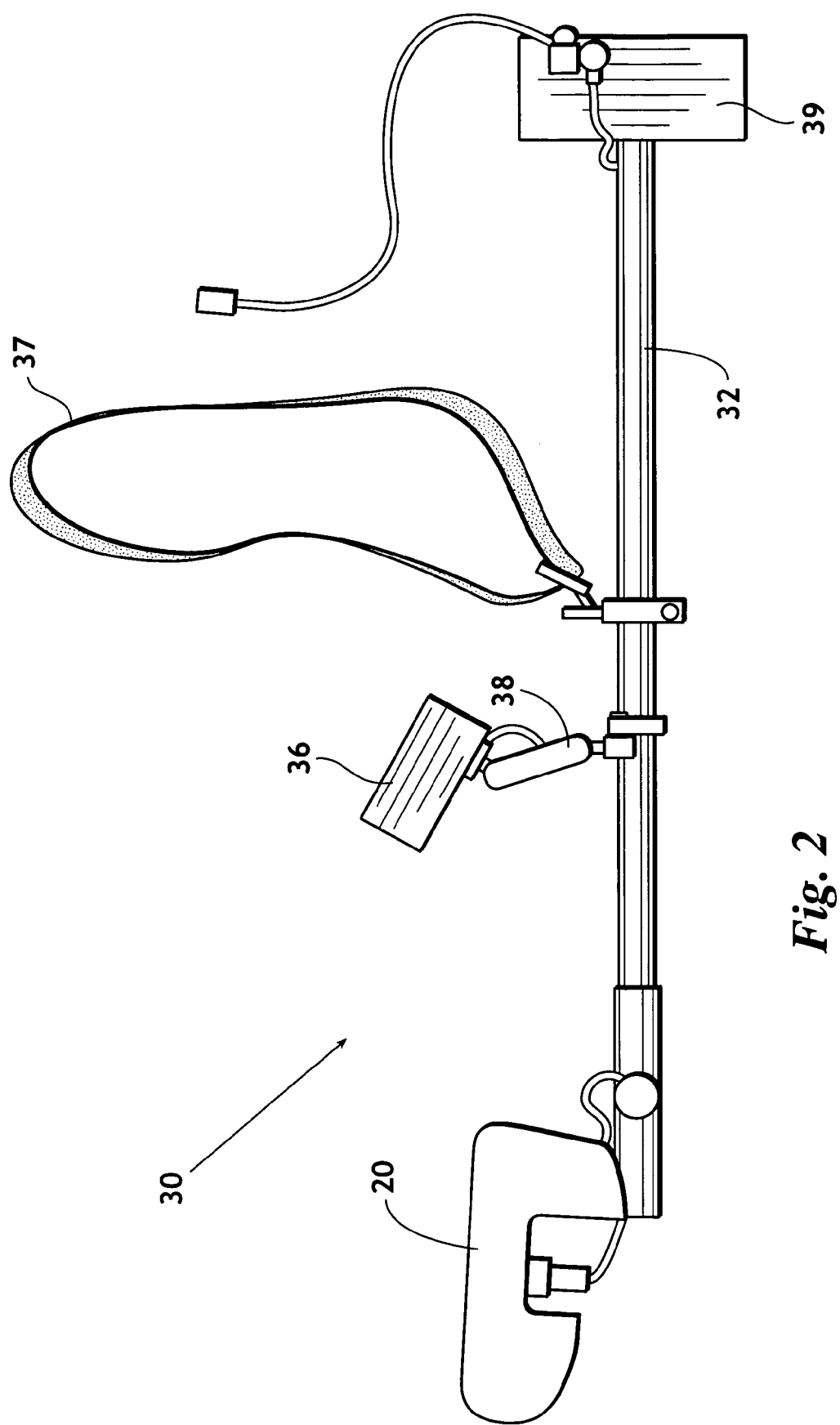
FIG. 2 provides a perspective view of a hand held analyzer wherein an active sensor is employed.

It should be noted that a number of different scanning techniques can be employed to sense plant conditions in conjunction with the inventive method. Reflectance sensors can be mounted on equipment, or handheld such as sensor 30 of FIG. 2, and sensors may be either active, or passive. One sensor suitable for use with the present invention is the sensor described in U.S. Pat. No. 6,596,996 entitled "Optical Spectral Reflectance Sensor and Controller" which is incorporated herein by reference. It should also be noted that the inventive method may also be used to determine fertilizer requirements for incorporation into a prescription map or even for fertilizer requirements for a blanket application of fertilizer to an entire field.

Figure 3:
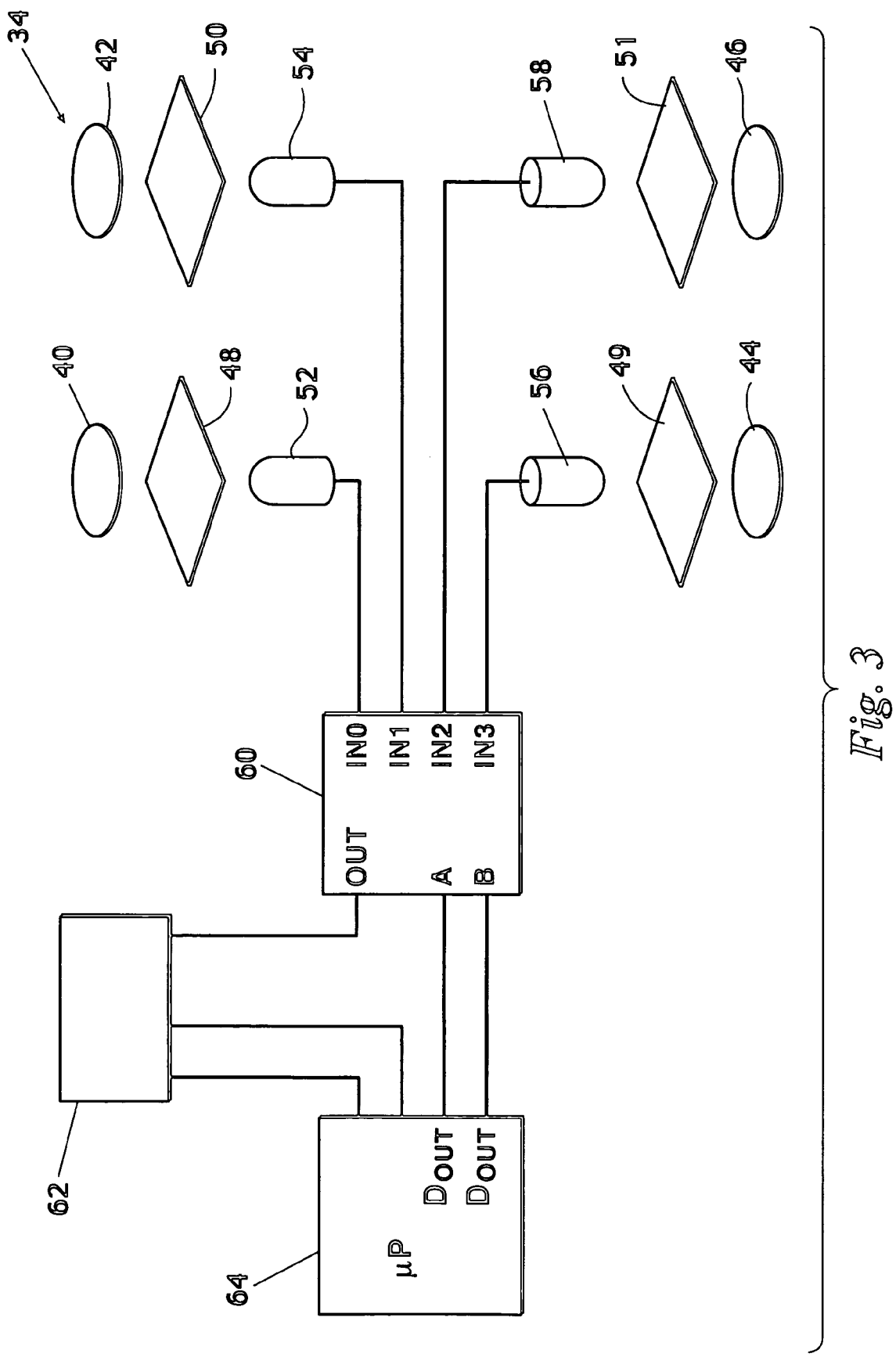
FIG. 3 provides a block diagram of a passive reflectance sensor suitable for use with the inventive method.

With further reference to FIG. 3, wherein is shown a block diagram of a passive sensor, to measure reflectance, a comparison must be made between light striking an object, preferably at a particular wavelength, and light reflected by the object. A passive sensor 34 preferably includes: up looking photodetectors 50 and 48 positioned beneath filters 48 and 50 and lenses 40 and 42; down looking photodetectors 52 and 54 positioned above filters 49 and 51; and lenses 44 and 46; an analog multiplexer 60; a microprocessor, or other computing device, 64; and a display or storage device 62. Preferably filters 48 and 49 filter light over the same color or range of wavelength, and similarly, filters 50 and 51 filter light of the same color. Preferably, sensor 30 provides for measurement of reflectance of red light and near infrared.

Generally speaking, a sensor may either emit light which is then reflected back to a receiver, referred to herein as an "active sensor" since the sensor actively produces its own light, or a sensor may take advantage of available light to measure reflectance properties, i.e., sensor 34, which, for purposes of this invention, is referred to as a "passive sensor". Either sensor is well suited for use on analyzer 30. Preferably handheld sensor 30 also includes: a boom 32; possibly a shoulder strap 37 for carrying sensor 30; and a control system 36 supported on sensor 30 by mount 38.

The normalized difference vegetation index ("NDVI") provides an estimate of the biomass of a plant at the time of measurement. NDVI, in light of growing days (days when the plant is actively growing), is highly correlated with the condition of a plant stand, and hence, with the expected yield. NDVI is the preferred vegetative index, but other vegetative indices can also be used to estimate plant biomass and expected yield. One method of determining NDVI is through the scanning of a plant, or group of plants, to determine the reflectance of the plant at red light having a wavelength of approximately 660 nanometers and the reflectance of the plant at near infrared light having a wavelength of approximately 780 nanometers. NDVI is then calculated as follows:

$$NDVI=(NIR-red)/(NIR+red)$$

where "NIR" is reflectance at near infrared light and "red" is the reflectance value at red light. It should be noted that NDVI is a dimensionless value. Other wavelengths can be used to calculate these indices and may be preferred for particular crops. It should be noted that a microprocessor, or other computing device, may be included in a sensor to perform the calculation of NDVI within the sensor.

In addition to determining NDVI for a particular plot, the coefficient of variation (CV) is also determined by performing several measurements of NDVI within a plot to determine the standard deviation and mean within the plot. CV, given in percentage, is calculated by:

$$CV=(\text{Standard Deviation/Mean})*100$$

Prior to application of the topdress fertilizer the number of growing days since planting (GDP) is preferably determined. "GDP" is defined as the number of days in which the plant is actively growing. A growing day is one where the average temperature, $(T_{min}+T_{max})/2$, is greater than 4.4 degrees Celsius such that GDP is adjusted to exclude days where ambient temperatures too low for active growth of the crop. This information is readily available in virtually any agricultural area. Typically, growing days are tracked by government agencies, universities, large farming operations, and the like. It should be noted that the inventive method may also use growing days since emergence in lieu of growing days since planting. For certain crops cumulative time and heat units in the form of growing degree days (GDD) may be used instead of GDP.

Assuming GDP is greater than zero, the in-season estimated yield index (INSEY) is calculated as follows:

$$INSEY = NDVI/GDP$$

It should be noted that INSEY can be thought of as an estimation of biomass per growing day. As such, INSEY is independent of the precise time of measurement since days from planting acts as a normalizing divisor.

Next, the potential yield level ($YP_0$) with no added nutrient can be calculated as follows:

$$YP_0 = 0.359 e^{(324.4 * INSEY)} (YP_0 \text{ in Mg/ha})$$

It should be noted that the coefficients of the above equation were empirically obtained for winter wheat. While the general form of the equation is valid for other crops, the coefficients may vary from crop-to-crop.

Typically when the inventive method is used with wheat, reflectance readings are collected between 80 and 150 days after planting. This coincides generally with plant growth between Feekes physiological growth stage 4 wherein leaf sheaths are beginning to lengthen, and stage 6 wherein the first node of the stem is visible.

Identifying a specific yield potential does not translate directly to a nutrient recommendation. Determining the extent to which the crop will respond to additional nutrient is equally important. Thus, as a preliminary matter, a nutrient response index (RI) for the field is preferably determined. The pre-plant non-limiting, or nutrient rich, strip was established in each field at, or near, planting time. Regardless of the particular fertilization practice employed by a farmer, the non-limiting strip can be used to determine the likelihood of obtaining an in-season response to a nutrient, such as nitrogen, specifically tailored to that particular farmer's practice. Prior to applying topdress nitrogen, the non-limiting strip will be scanned to determine NDVI, as will be the parallel strip fertilized according to the conventional practice of the farmer. Measurements are paired spatially. The response index may then be calculated as:

$$RI_{NDVI} = NDVI \text{ from the non-limiting strip}/NDVI \text{ from the farmer practice strip.}$$

The highest NDVI measurement along the nitrogen-rich strip can be used to calculate the maximum potential yield ($YP_{max}$), the maximum yield that could be expected within the most productive area in a field where nitrogen is not limiting for the crop season in measurement.

Where a nutrient rich non-limiting strip was not established at or before planting, or the nutrient was not applied prior to planting, $RI_{NDVI}$ may instead be determined by sensing the spatial variability in NDVI reading from one pass through the entire field. The response index computed from spatial variability ($RI_{SV}$) is calculated by:

$$RI_{SV} = (\text{Average NDVI from one pass through the field} + 1 \text{ standard deviation})/(\text{Average NDVI from the same pass} - 1 \text{ standard deviation})$$

Alternatively, the response index can be calculated as the ratio of the expected yield of the N-rich strip divided by the expected yield of the farmer practice strip. Expected yields are calculated using the equations of paragraphs [0041] and [0042]. The response index is denoted as the potential yield response index ($RI_{yp}$) and given by:

$$RI_{yp} = YP_{NRich}/YP_{FldRate}$$

Where $YP_{NRich}$ is the expected yield of the N-rich strip and $YP_{FldRate}$ is the expected yield of the reference strip planted according to the normal practice of the farmer.

Figure 4:
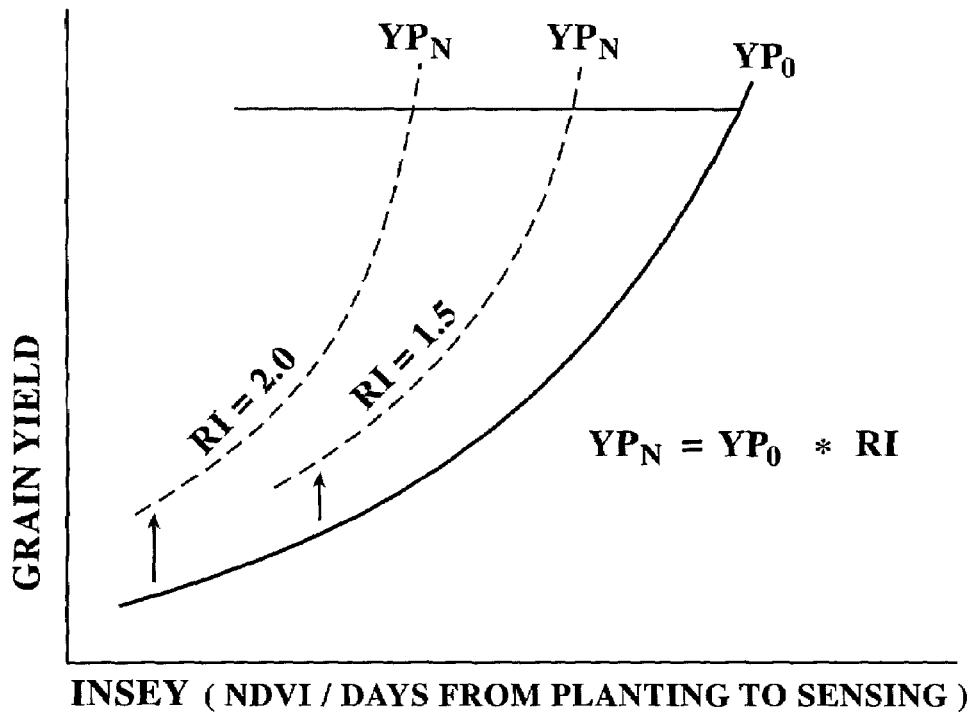
FIG. 4 provides a diagram of the relationship between INSEY, grain yield, and the response index.

Referring to FIG. 4, wherein the relationship between INSEY and grain yield is shown relative to the response index, if CV is not considered, as in prior art techniques, the predicted maximum potential yield with added nutrient X ($YP_X$) is calculated as:

$$YP_X = YP_0 * RI \; (YP_X \text{ in kg/ha})$$

It should be noted that two limits are preferably imposed on this calculation, namely: 1) $RI_{NDVI}$ cannot exceed 3.0; and 2) $YP_N$ cannot exceed $YP_{MAX}$ where $YP_{MAX}$ is the biological maximum for a specific crop, grown within a specific region, and under defined management practices. Alternatively, $YP_{MAX}$ can be defined as the expected yield (calculated by equations in paragraphs [0041] and [0042] for the highest NDVI measurement from the N Rich fertilizer strip. The value of 3.0 for maximum RI may vary for a specific crop, grown in a specific region under different conditions. It is possible to avoid explicitly calculating the response index, while calculating YPx as function of a measurement within the farmer practice area, using certain curve fitting techniques. However, these curve fitting techniques incorporate the concept of RI.

Figure 5:
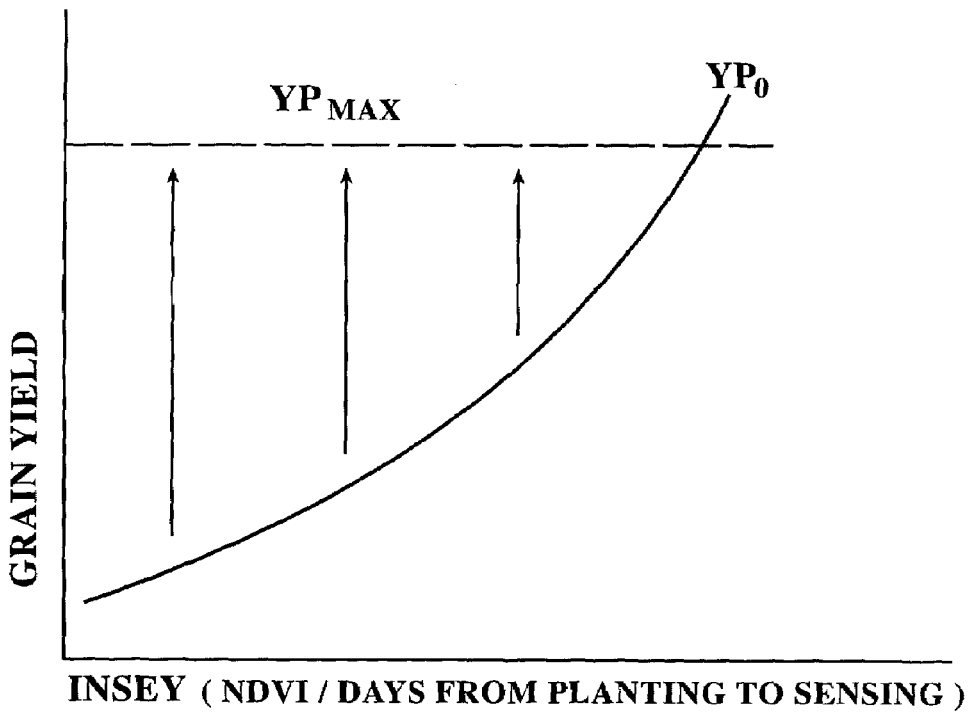
FIG. 5 provides a diagram of the relationship between INSEY, grain yield, and maximum yield when CV is constant.

Turning next to FIG. 5, when CV's measured throughout the field are homogenous and low, plant stands are uniform which is, in turn, indicative of uniform soil productivity, i.e. uniform soil depth, uniform slope, uniform moisture holding capacity, and the like, and a very high response index. In this environment, early season nitrogen stress is not yield limiting or yield restrictive. However, if added nitrogen is not applied, decreased yield will occur in nitrogen stressed areas. The yield obtainable with added fertilizer ($YP_X$) will be the same as the predicted maximum potential yield of the non-limiting reference strip for most or all values of NDVI. In other words, the potential crop yield in all locations within a field can be raised to the maximum potential yield with the addition of nitrogen fertilizer.

Figure 6:
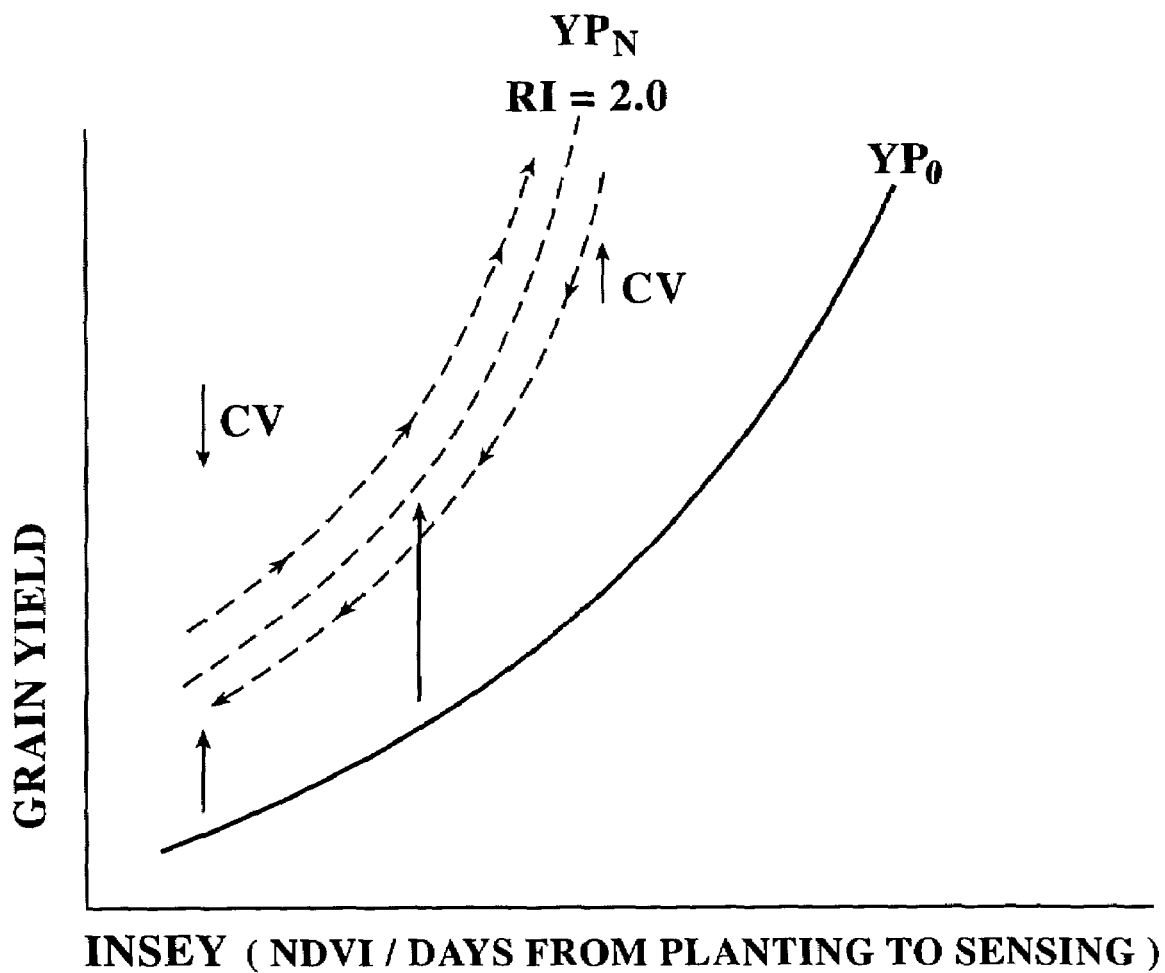
FIG. 6 provides a diagram of the relationship between INSEY, grain yield, in light of the response index and CV.

With reference to FIG. 6, where CV are not homogenous and low, the yield potential will vary throughout the field on a plot-by-plot basis. In this case, yield potential is determined as described above. The obtainable yield, however, is adjusted by the CV of each plot. When CV is high in a plot, $YP_X$ will be lower. When CV is low in a plot, $YP_X$ will be higher. Following this philosophy, if CV in a plot is low then the obtainable yield with added nutrient approaches the maximum yields that can be achieved, even under severe early-season nutrient stress. Alternatively, if CV in a plot is high then the obtainable yield is reduced.

More particularly, the variability within a site impacts the response index of that site. The relationship between the response index and the coefficient of variation for winter wheat is given by:

$$RI_{CV} = RI_{CV0} * (-0.01219 * CV + 1)$$

Where $RI_{CV0}$ is the response index when CV is equal to 0. It should be noted that, when measured in the field, NDVI always has a CV greater than 0. The intercept $RI_{CV0}$ can be calculated by:

$$RI_{CV0} = RI_{Max}/(-0.1219 * CV_{MaxRI} + 1)$$

Where $RI_{Max}$ is the maximum response index along the N-rich strip and $CV_{MaxRI}$ is the CV of the field rate NDVI used to calculate $RI_{Max}$.

In a preferred embodiment, a generalized approach is used to calculate the yield potential for a site as follows:

$$YP_{CV} = RI_{CV} * YP_0$$

Where $RI_{CV}$ is derived from $RI_{NDVI}$, $RI_{YP}$, or any other response index operative to predict increased yield with additional fertilizer. It should be noted that the effect of CV on the response index is similar to that seen with changes in measured response index. Although the CV of wheat is generally very low, there can be instances when yields predicted using $RI_{CV}$ are greater than $YP_{Max}$.

After an obtainable yield is determined, the predicted percent of nutrient X in the grain (PXG) is obtained from known averages in a specific crop type. It should be noted that "crop type" refers to a particular type of grain, rather than a species of grain, i.e., winter wheat, spring wheat, hard red, soft red, hybrid corn, sorghum, rice, etc. PXG is multiplied by $YP_X$ to obtain the mass (in kg) of X nutrient taken up in the grain. The average percent of a particular nutrient in a specific grain may be adjusted for regional variations.

Next, the predicted grain nutrient uptake (GXUP) at $YP_X$ and $YP_0$ are calculated:

$$GXUP_{YPX}=PXG*YP_X \text{ kg/ha}$$

$$GXUP_{YP0}=PXG*YP_0 \text{ kg/ha}$$

From these values, the in-season topdress fertilizer nutrient X requirement (FXR) is given by:

$$FXR=(GXUP_{YPX}-GXUP_{YP0})/EFF_X$$

where $EFF_X$ is the maximum nutrient use efficiency of an in-season application of nutrient X in the manner applied. $EFF_X$ via in-season application for most required plant nutrients is approximately 0.7. $EFF_P$ is known to be approximately 0.5 for topdress phosphorus.

It should be noted that this procedure produces results which may be dramatically different from the procedures in current use. The inventive method prescribes increased nutrient application rates in areas of the field with high yield potential as indicated by INSEY and low CV, and reduced nutrient application rates in areas of the field with lower yield potential or plants experiencing stress due to factors another nutrient availability. This is contrasted with prior thinking where fertilizer is applied in an attempt to bolster production in areas of a field having low production and withheld in areas of a field having relatively high production. Thus it can be seen that the purpose of the inventive method is to restrict the application of a nutrient to just the amount required such that the nutrient is not the limiting factor in crop yield.

It should also be noted that the absolute height of a plant stand also provides some indication of plant health, and can be useful in adjusting the yield which may be attainable with added nutrient ($YP_N$). When plant height is at, or above, an expected height for a given number of growing days, $YP_N$ for purposes of determining fertilization rate is the maximum potential yield for the crop. When a plant exhibits slightly less height than is expected, $YP_N$ is the potential yield times the response index, adjusted by the difference between the expected height and the measured height. When a plant is shorter than a given minimum height, determined by the type of crop, the area, and the general growing conditions, $YP_N$ is most likely influenced by factors other than nutrient stress and the attainable yield is simply the potential yield with no added nutrient.

As will be apparent to those skilled in the art, the variability of NDVI over a relatively small area is indicative of factors which impact plant condition other than nutrient stress and further, that an inverse relationship exists between the yield which is attainable with added nutrient and CV. It has also been observed that plant height is indicative of plant forage and grain yield and that variations in plant height over a similarly small area are likewise indicative of factors which affect plant condition other than nutrient stress. Accordingly, when CV from optical sensor measurements is unavailable, or impractical to measure, plant height of individual crops can be measured and the coefficient of variation of plant height can be used to adjust an attainable yield in the same manner as NDVI and the CV of NDVI is used. It should be noted, however, since NDVI is preferably measured to determine yield potential, obtaining the coefficient of variation of NDVI is a simple matter, assuming the sensor provides sufficient optical resolution. Where yield potential is estimated through other techniques, or where NDVI cannot be sensed with sufficient resolution, estimating plant attainable yield with added nutrient ($YP_N$) and adjusting $YP_N$ with the CV of plant height is an acceptable alternative.

It should be further noted that while the discussion of preferred embodiment is provided with regard to using the inventive method to improve the efficiency of farming cereal grain crops, in particular winter wheat the inventive method has far broader application and is useful for improving the growth of virtually any plant, and especially applicable to all cereal grain crops. While the constants used in the calculation of $YP_0$ and $YP_X$ may vary somewhat between various types of plants, as well as the ranges of CV associate with fertilization strategy, the steps to arrive at the required fertilization rate are the same.

It should be further noted that while a plot size of 0.4 square meters is appropriate for winter wheat, other plot sizes may be better suited for other plant types. In row crops, i.e. corn, sorghum, etc., it is preferable to treat plants on a plant-by-plant basis rather than using a fixed area. In row crops, CV represents the intraplant variation rather than the variation of all plants within a fixed area. Thus, a plot may represent a group of plants within a fixed area, an individual plant stand, or a series of plant arrayed linearly in a row.

As will be apparent to those skilled in the art, the inventive method is well suited for incorporation into a software program for execution by a microprocessor or other computing device. When combined with a reflectance sensor as described hereinabove, the inventive method is ideally suited for use in a system which measures reflectance, calculates the requirements for nutrient X (FXR), and controls a variable rate applicator, in real time. In such a system, the calculations detailed hereinabove may be reduced to one or more computer programs stored on a computer readable storage device. Preferably, the program will be arranged in a modular fashion such that individual modules are responsible for each calculation and each control function.

As a practical matter, it may not be desirable to perform all of the above described steps in a spraying apparatus at the time of spraying. As will be apparent to those skilled in the art, as sites get smaller, the amount of processing required to keep up with a sensor and its associated sprayer gets larger. Thus, to the degree possible, it may be desirable to perform as much of the calculation as possible, and reduce as many variables to constants as possible, prior to treating a field.

In the alternative, the process of determining NDVI and coefficient of variation for both the farmer practice and the paired value from the N-rich strip, as well as the calculation of RI and the values of the maximum potential yield, may be reduced to software within a sensor/applicator. Consequently, the sensor/applicator can be driven along the edge of the N-rich strip and simultaneously scan the N-rich strip and the adjacent farmer practice. Measurements can thus be simultaneous made and parameters automatically computed. The same automatic measurements can be made with a manual sensor having a GPS, or other position sensing capability. The scanner is simply passed over the N-rich strip and then over the adjacent farmer practice, or vice versa, and the sensor automatically calculate NDVI and CV for each site and then pairs sites based on position when the opposite strip is scanned.

Finally, it should also be noted that, while farming applications of the inventive method were discussed in relation to the preferred embodiment, the invention is not so limited. The inventive method could be used to improve the efficiency of the application of fertilizer in virtually any crop. While the constants in the equations given above may vary from crop-to-crop, the inventive method is otherwise applicable to virtually any type of plant and can be applied, with minor modification, to any crop nutrient whose projected need could be based on predicted uptake in the grain, derived from predicted yield or $YP_0$. In addition, the inventive method is not limited to liquid fertilizers, but can also be used in the application of solid and gaseous forms. Accordingly, the terms "sprayer" and "nozzle" should be interpreted broadly to include applicators appropriate to the form of fertilizer selected.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method for in-season nutrient application to a crop including the steps of:
   (a) determining a maximum potential crop yield for a field;
   (b) determining a nutrient response index for a field;
   (c) determining a reference coefficient of variation for the nutrient response index;
   (d) measuring a normalized difference vegetation index for a plot within said field;
   (e) determining a coefficient of variation within said plot;
   (f) determining a predicted yield for said plot;
   (g) determining an attainable plot yield with added nutrient as a function of said predicted yield, said nutrient response index, and said reference coefficient of variation;
   (h) determining the nutrient removal at said predicted plot yield;
   (i) determining the nutrient removal at said attainable plot yield;
   (j) determining the amount of additional nutrient which must be supplied to achieve said attainable plot yield; and
   (k) applying said amount of nutrient to said plot.

2. The method for in-season nutrient application to a crop of claim 1 wherein step (b) includes the substeps of:
   (b) determining a nutrient response index for a field by performing the steps of:
   (i) providing a first area treated with the nutrient such that said first area is a non-limiting fertilized area;
   (ii) providing a second area treated with a predetermined amount of the nutrient;
   (iii) determining a normalized difference vegetation index for said first area;
   (iv) determining a normalized difference vegetation index for said second area; and
   (v) dividing said normalized difference vegetation index for said first area by said normalized difference vegetation index for said second area.

3. The method for in-season nutrient application to a crop of claim 1 wherein step (d) includes the substeps of:
   (d) determining the normalized difference vegetation index for a plot within said field by performing the steps of:
   (i) scanning said plot with a reflectance sensor, said reflectance sensor sensing reflectance at red light and at near infrared light;
   (ii) determining the reflectance of the vegetation in said plot to red light;
   (iii) determining the reflectance of the vegetation in said plot to near infrared light; and
   (iv) dividing the difference of the reflectance determined in step (d)(iii) minus the reflectance determined in step (d)(ii) by the sum of the reflectance determined in step (d)(ii) and the reflectance determined in step (d)(iii).

4. The method for in-season nutrient application to a crop of claim 3 wherein step (e) includes the substeps of:
   (e) determining a coefficient of variation within said plot by performing the steps of:
   (i) performing steps (d)(i) through (d)(iv) successively over said plot;
   (ii) calculating the standard deviation of the normalized difference vegetation index of said plot;
   (iii) calculating the mean of the normalized difference vegetation index of said plot; and
   (iv) calculating the coefficient of variation of the normalized difference vegetation index for said plot.

5. The method for in-season nutrient application to a crop of claim 1 wherein step (f) includes the substeps of:
   (f) determining a predicted yield for said plot by performing the steps of;
   (i) determining the number of growing days since the planting of the crop;
   (ii) calculating an in-season estimated yield index for said plot by dividing said normalized difference vegetation index measured in step (d) by said number of growing days determined in step (f)(i); and
   (iii) calculating the predicted crop yield for said plot as a function of the in-season estimated yield index for said area.

6. The method for in-season nutrient application to a crop of claim 1 wherein step (g) includes the substeps of:
   (g) determining an attainable yield by performing the steps of:
   (i) adjusting the response index of step (b) as a function of the coefficient of variation of step (e); and
   (ii) multiplying the predicted yield of step (f) times the adjusted response per PTO query response index of step (g)(i).

7. The method for in-season nutrient application to a crop of claim 1 wherein said nutrient is nitrogen.

8. The method of claim 1 wherein the coefficient of variation determined in step (e) is the coefficient of variation of the normalized difference vegetation index measured in step (d).

9. The method of claim 1 wherein the coefficient of variation determined in step (e) is the coefficient of variation of plant height of plants within said plot.

* * * * *

UNITED STATES PATENT AND TRADEMARK OFFICE
CERTIFICATE OF CORRECTION

| | | |
|---|---|---|
| PATENT NO. | : 7,188,450 B2 | Page 1 of 1 |
| APPLICATION NO. | : 10/801757 | |
| DATED | : March 13, 2007 | |
| INVENTOR(S) | : Raun et al. | |

It is certified that error appears in the above-identified patent and that said Letters Patent is hereby corrected as shown below:

Col. 12, line 54 the words "adjusted response per PTO query response index of" should read --adjusted response index of--

Signed and Sealed this

Twenty-ninth Day of May, 2007

JON W. DUDAS
*Director of the United States Patent and Trademark Office*